United States Patent [19]

Lee

[11] 4,249,181
[45] Feb. 3, 1981

[54] CELLULAR MOBILE RADIOTELEPHONE SYSTEM USING TILTED ANTENNA RADIATION PATTERNS

[75] Inventor: William C. Lee, Denville, N.J.

[73] Assignee: Bell Telephone Laboratories, Incorporated, Murray Hill, N.J.

[21] Appl. No.: 18,455

[22] Filed: Mar. 8, 1979

[51] Int. Cl.³ .............................................. H04B 7/00
[52] U.S. Cl. ................................ 343/100 CS; 455/33; 455/50; 455/54; 455/57
[58] Field of Search .................. 343/100 AD, 100 CS; 455/33, 50, 54, 56, 57

[56] References Cited

U.S. PATENT DOCUMENTS

| 3,663,762 | 5/1972 | Joel . | |
|---|---|---|---|
| 3,922,677 | 11/1975 | Tomkewitsch et al. . | |
| 4,128,740 | 12/1978 | Graziano ........................... | 455/33 X |

*Primary Examiner*—T. H. Tubbesing
*Attorney, Agent, or Firm*—Charles S. Phelan

[57] ABSTRACT

In cellular mobile radiotelephone systems employing reuse of a predetermined set of channels in adjacent iterations of a pattern of cells (FIG. 1), average signal-to-interference ratio in at least one cell region of interest is improved by tilting the antenna (11,12) gain pattern center-beam line of an antenna serving that region below the horizontal (FIG. 3). In one embodiment the tilt ($\theta$) is sufficient to create a reduced-gain notch (FIG. 8) in the center-beam portion of the pattern.

8 Claims, 10 Drawing Figures

D/R = 4.6
N = 7 SETS

CELLULAR MOBILE RADIOTELEPHONE SYSTEM USING TILTED ANTENNA RADIATION PATTERNS

BACKGROUND OF THE INVENTION

This invention relates to cellular mobile radiotelephone systems; and it relates, in particular, to antenna operating systems therefor.

Cellular mobile radiotelephone systems in which a predetermined set of frequency channels are reused in recurring patterns of adjacent cells are now known in the art. One example of such a system may be found in the A. E. Joel, Jr. U.S. Pat. No. 3,663,762. In the Joel patent, arrays of directional antennas are driven with a common signal and arranged to operate in an omnidirectional mode insofar as an individual cell is concerned. However, other cellular systems are known which employ directional antennas at selected points in a cell to achieve complete coverage of an individual cell by means of, for example, plural directional antennas.

It is also known in the art to direct an antenna for enhanced transmission between that antenna and another at a remote site as, for example, in the case of point-to-point radio transmission systems wherein a directional antenna is accurately aligned to direct a radio beam substantially only to a predetermined target site. Similarly, directional radio transmissions are used in radio location systems for motor vehicles as taught, for example, in the R. V. Tomkewitsch et al. U.S. Pat. No. 3,922,677 wherein it is noted that signals from above or below a predetermined directional antenna pattern are severely attenuated.

Further, in connection with cellular radio systems, they are often operated on a signal-to-interference (S/I) ratio basis using various techniques, including the frequency modulation capture effect, to contain interference appearing at one cell antenna site from nearby cochannel antenna sites. The perfect prevention of all such cochannel interference is usually too costly a goal for commercial systems so a goal of an average S/I level over the area of a cell, or a sector of a cell, and which is found to be acceptable to most users, is taken as a compromise solution. The term "average" is herein used in reference to S/I ratio in the common, i.e., not out of the ordinary, sense rather than in the arithmetic mean sense. That is, an average S/I ratio is one which is common to a large part of a region of interest. For example, in cellular radiotelephone systems a system operating objective is established so that among S/I measurements made throughout a region of interest no more than a predetermined small portion of the region will experience S/I below a predetermined minimum. For purposes of the present presentation, the minimum S/I for all but that small portion is said to be the average S/I. In one cellular system, a requirement that has been found to be useful is to have a minimum S/I of 17 db over at least 90% of a call coverage area such as a cell, or a predetermined sector of a cell; and such a criterion enables most users to consider transmission quality of a radio channel in that region to be good or excellent. Such an average S/I figure thus is not absolutely applicable for every call from any mobile unit at every point in the region involved.

It is desirable, both as a system design tool and for improving the S/I performance of a system or of operations in a particular region served by a system, to be able to improve signal-to-interference performance in as inexpensive a fashion as possible. One difficulty with such improvements that might be attempted by modifying an antenna operating system is that even for the smallest cells usually considered in the present state of the art there is more than an order of magnitude difference between the height of a cell site antenna from the ground on the one hand and the distance between the antenna and the edge of a cell region served thereby on the other hand. Therefore the portion of an antenna gain pattern which affects a remote edge of a serving cell region is substantially the same as the portion affecting a nearby cochannel interfering cell. Consequently, antennas in cellular systems have been typically oriented to direct their principal radiation along a plane which is essentially horizontal, i.e., parallel to a plane that is tangent to the average curvature of the earth at the base of the antenna site. Reliance has been placed upon propagation loss effects and the placement of cochannel antenna sites at a sufficient spacing to assure acceptably low levels of cochannel interference.

SUMMARY OF THE INVENTION

In an illustrative embodiment of the present invention, the average S/I ratio in a cell region served by a serving cell antenna site is improved by tilting the antenna gain pattern downward by a predetermined amount. A limited loss of antenna gain is accepted in some parts of the serving cell in order to achieve the increase in average signal-to-interference ratio for the total cell area involved.

In one embodiment of the invention, the antenna gain pattern of a directional antenna is tilted sufficiently to create a notch in the horizontal-plane gain pattern, which notch is characterized by a contained sector of reduced field intensity. That sector is advantageously made to span a nearby cochannel interfering cell in order to reduce reception from that cell and also reduce serving cell interfering transmission to that cochannel cell.

BRIEF DESCRIPTION OF THE DRAWING

A more complete understanding of the invention and its various features, objects, and advantages may be obtained from a consideration of the following detailed description in connection with the appended claims and the attached drawings in which:

DETAILED DESCRIPTION

Figure 1:
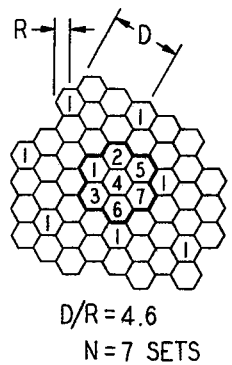
FIG. 1 is a simplified diagram of a cellular mobile radiotelephone cell layout for a system utilizing the subject invention.

In the cell layout diagram of FIG. 1, a cellular system utilizing a 7-cell pattern of cells is assumed. In that pattern, a different part of a predetermined set of channels is assigned to each of the 7 cells numbered 1 through 7 in a central pattern in the diagram of FIG. 1 and enclosed by broader lines than those enclosing individual cells. That same pattern and channel set are iteratively employed in adjacent cell pattern regions throughout the mobile service area which is to be served. For simplicity in the drawing, only the cell number 1 in each illustrated recurrence of the 7-cell pattern is designated by the reference numeral 1 to make it relatively simple to identify such cochannel cells which could conceivably interfere with one another. In such an arrangement employing a 7-cell pattern, the ratio of the distance D between centers of nearest cochannel cells and the radius R of a cell is equal to approximately 4.6 as indicated on the drawing.

Although each cell is in the drawing identified as having a specific cell boundary, in this case of hexagonal form, the indicated boundary is only a nominal boundary for convenience of system design and description. Real equal-signal-level contours between cells vary from the hexagonal configuration to a substantial degree because of factors such as the topology of the region involving a particular cell and environmental atmospheric conditions.

It has been found that certain useful effects are obtained in a system of the type shown in FIG. 1 by tilting antenna radiation patterns to angles below the horizontal, and these effects are particularly advantageous in cellular radio systems. The range of useful tilt angles depends upon such factors as requirements for average S/I, antenna type and height, and cell size.

Figure 2:
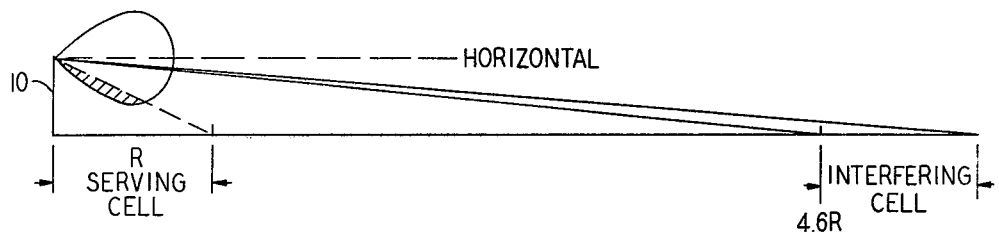
FIGS. 2 and 3 are side elevation views of serving and interfering cell pairs in a system of the type illustrated in FIG. 1.

FIG. 2 illustrates, on a greatly distorted scale, an antenna gain pattern, a serving cell in which the pattern is employed, and a nearby interfering (cochannel) cell. One example of the dimensional scale distortion which is necessary for convenience of illustration is seen by recognizing that in such an arrangement the antenna is mounted atop a mast 10 at a height above ground which is in many cases about 200 feet. Assuming that the mast 10 is located at the center of the serving cell and that a typical radius R of the cell is 8 miles, the radius is more than 2 orders of magnitude larger than the antenna height. The interfering cell is located to the right at a distance 4.6 times R, i.e., approximately 37 miles from the antenna mast 10 to the center of the interfering cochannel cell. Again for convenience of illustration, no antenna mast or antenna gain pattern is shown for the interfering cell; but it is to be understood that similar equipment is provided in the interfering cell and may be directed toward the serving cell or in some different direction depending upon whether the system employs omnidirectional or directional antenna systems. In other words, any cell will usually be both a serving cell and an interfering cell.

In FIG. 2, ray lines are extended from the top of the mast 10 to the near and far edges of the interfering cell and to the edge of the serving cell. The distortion in the scale of the drawing is again evident if one considers, for example, the system with 8-mile cells and a 200 foot antenna mast 10. The geometry of such an arrangement would put a ray from the top of the mast to the right-hand edge of the serving cell at an angle of approximately ½ degree below the horizontal and similar ray lines to the interfering cell would be even closer to the horizontal. Other diagrams will be discussed subsequently to place the distance factors in better proportion. It is sufficient, however, to note at this point, and as indicated in FIG. 2, that the serving cell is largely served by lower gain portions on the lower side of the antenna gain pattern. However, this factor alone is not a major problem in cellular operation because in the ideal case the signal intensity in the serving cell is approximately 17 db more favorable than in the interfering cell.

As the antenna gain pattern is tilted downward, from the horizontal orientation, the edge of the serving cell is initially served by somewhat lower gain portions of the pattern; and then it very rapidly falls into a part of the pattern on the upper side of the major lobe of the pattern where a small change in the angle of tilt has a much larger reducing affect on the gain at both the edge of the serving cell and the interfering cell. However the serving cell edge is nevertheless through most of the tilt range in the better gain portion of the pattern. In addition, an increasing portion of the remainder of the serving cell is served by higher gain parts of the antenna gain characteristic than was the case with no tilt. As a result of the tilt there is both an increase in serving cell signal levels within that cell and a decrease in cochannel interfering cell signal levels received in the serving cell. It has been found that this tilting not only improves the average S/I ratio area served by the antenna, it also produces antenna gain pattern effects which make additional benefits available in the serving cell as will be described.

Figure 3:
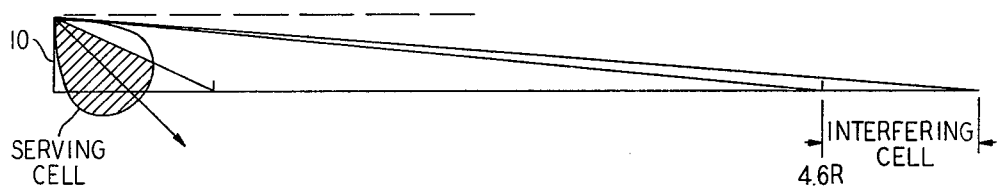

The fact that more of the serving cell is served by higher gain portions of the tilted antenna characteristic is evident in FIG. 3 because more ray lines from the top of the mast 10 and intersecting the antenna gain pattern also intersect the ground level plane within the serving cell as shown in the drawing. This diagram also shows the case which will be subsequently further discussed in which the center-beam ray line through the maximum gain portion of the pattern intersects the ground level plane at a point in the serving cell which is significantly closer to the mast 10 than is the edge of the cell.

Antenna tilting can be achieved in many ways, either electrical or mechanical, as is well known in the art. Likewise, the tilting can be practiced in connection with either directional or omnidirectional antenna systems.

Figure 4:
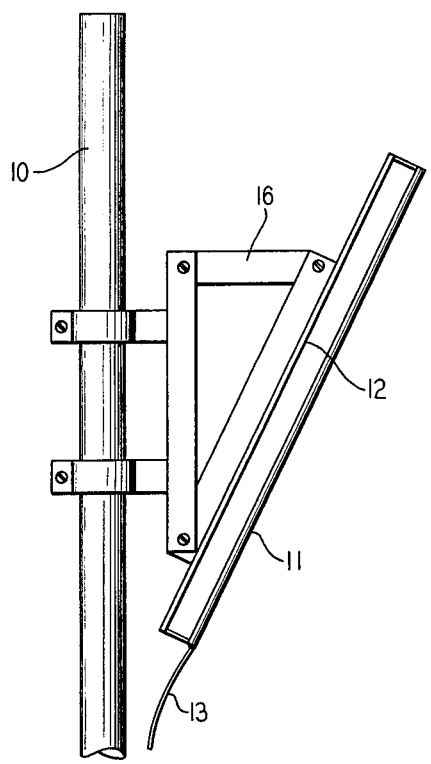
FIG. 4 is a diagram of a tilted directional antenna in accordance with the invention.

FIG. 4 illustrates one example of a tilted directional antenna which is of the type represented by the Phelps Dodge Communications Company No. 1111 unidirectional antenna. This antenna includes plural collinear dipoles in a tube 11 mounted on a reflector grid 12 (shown schematically in edge view). The dipoles are driven in phase for producing a gain pattern characterized in the vertical plane in the manner illustrated by the patterns in FIGS. 2 and 3 and shown in more particular detail in FIG. 5. A cable 13 extends to transmitting and/or receiving equipment (not shown) comprising no part of this invention. That pattern will be subsequently described in greater detail. The tilting is achieved by any suitable mounting arrangement, adjustable or fixed, such as the triangular mounting framework 16 on the mast 10.

Figure 6:
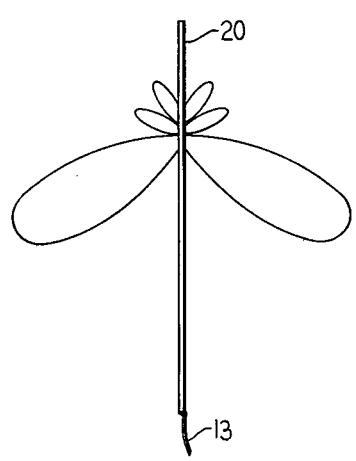
FIG. 6 is a diagram of an antenna with a superimposed electrically tilted antenna gain pattern for an omnidirectional effect.

FIG. 6 illustrates one example of an omnidirectional antenna system wherein a rod element 20 is provided, as in the case of the tube 11, with contained plural dipoles appropriately coupled to a cable 13. In this case, however, the dipoles are connected to be driven in different phases for effecting a tilting of the antenna omnidirectional gain pattern. A vertical plane section of such a tilted gain pattern is superimposed on the antenna in FIG. 6 for purposes of illustration. Either directional or omnidirectional systems may, of course, be tilted by electrical arrangements utilizing, for example, phased arrays. Also, the omnidirectional antenna system can be implemented by a plurality of directional antennas electrically operated in phase and arranged cooperatively to cover a full 360 degrees in a horizontal plane around the antenna mast; and one or more of the directional antennas are advantageously tilted for improving average S/I in the served region.

Figure 5:
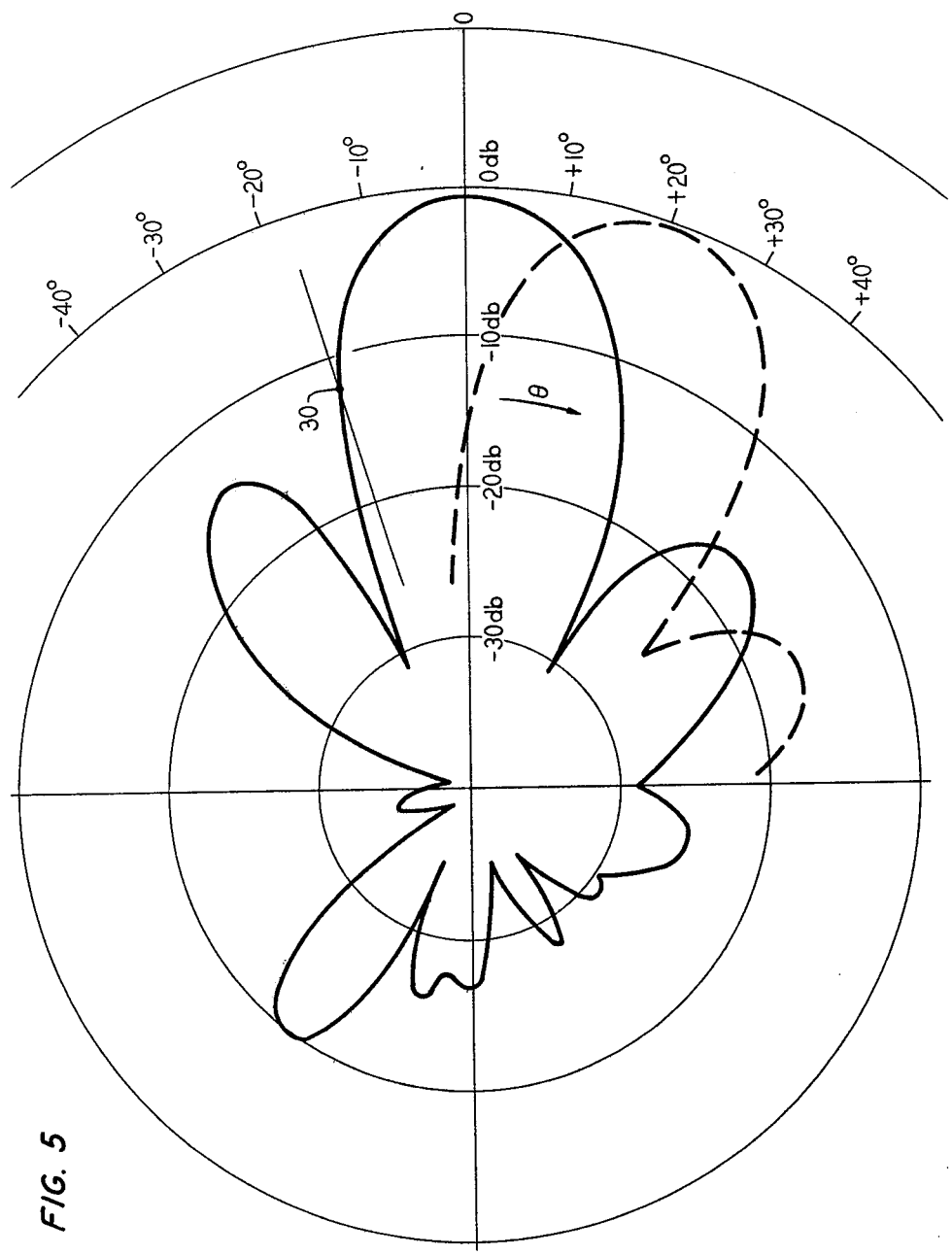
FIG. 5 is a diagram of antenna gain patterns taken in a vertical plane at center beam for the antenna for FIG. 4.

Returning now to a consideration of FIG. 5, there is shown the antenna gain plot in a vertical plane for the directional antenna of FIG. 4. This plot is, however, typical of many high gain vertical antennas and is presented in the usual polar coordinate format considering the antenna to be at the center, or focus, of the diagram where ray lines indicating different elevations converge. The concentric rings of the diagram indicate increasing gain with increasing ring radius, the gain being a representation in decibels (db) of the output field intensity at a predetermined distance from an indicated antenna, when driven by a predetermined power level, as compared to a known reference antenna output field intensity when similarly located and driven. Thus, the 0 db ring in FIG. 5 represents a result which is the same as that achieved by the reference antenna. Elevation angles are indicated as positive below the horizontal and negative above. No distance factor is included in the diagram because once energy is launched from the antenna its transmission is then a function of topology and atmospheric conditions. However, one can readily note from the angles on the diagram and elementary trigonometric functions, and, e.g., for a 200 foot mast, that a ray at 2 degrees below horizontal intersects a ground level plane at about 1 mile from the mast; and a ray at 30 degrees intersects the ground level plane at about 350 feet from the mast.

A point 30 is indicated in FIG. 5 in the upper portion of the major lobe in the gain pattern, and it corresponds to an intersection of the antenna characteristic with a ray line at approximately minus 18 degrees. Such intersection is then at approximately a $-12$ db gain level, and it can be seen that at that point on the ray line small changes in either clockwise or counterclockwise tilt of the gain pattern produce large changes in the gain experienced along the indicated 18 degree ray line. Similarly, if the antenna pattern is rotated in a clockwise direction about the center of the diagram, i.e. tilted downwardly, by approximately 18 degrees, the point 30 would then represent the intersection of the gain characteristic with the 0 degree ray line, i.e., the horizontal plane.

As the aforementioned tilting of the gain pattern begins, the gain on the 0 degree ray line changes slowly at first and much more rapidly after the first few degrees. When the pattern has been rotated by 20 degrees, as indicated in part by dashed lines in FIG. 5, it is apparent that most of the serving cell is served to a greater extent by higher gain parts of the antenna pattern, i.e., more ray lines through the tilted pattern intersect the ground level plane within the cell than is the case for the untilted orientation. Of course, the outer several miles closest to the circumference of the nominal cell boundary also experience a substantial reduction in antenna gain service; but there is an advantage gained in terms of the average S/I over the entire served area of interest in the serving cell. The loss of higher gain service in that fringe region of the serving cell is of much less consequence there than it is in the interfering cell because antenna radiated power is relatively easily increased at plural cell sites to maintain adequate call signal levels without affecting the S/I ratio.

Figure 7:
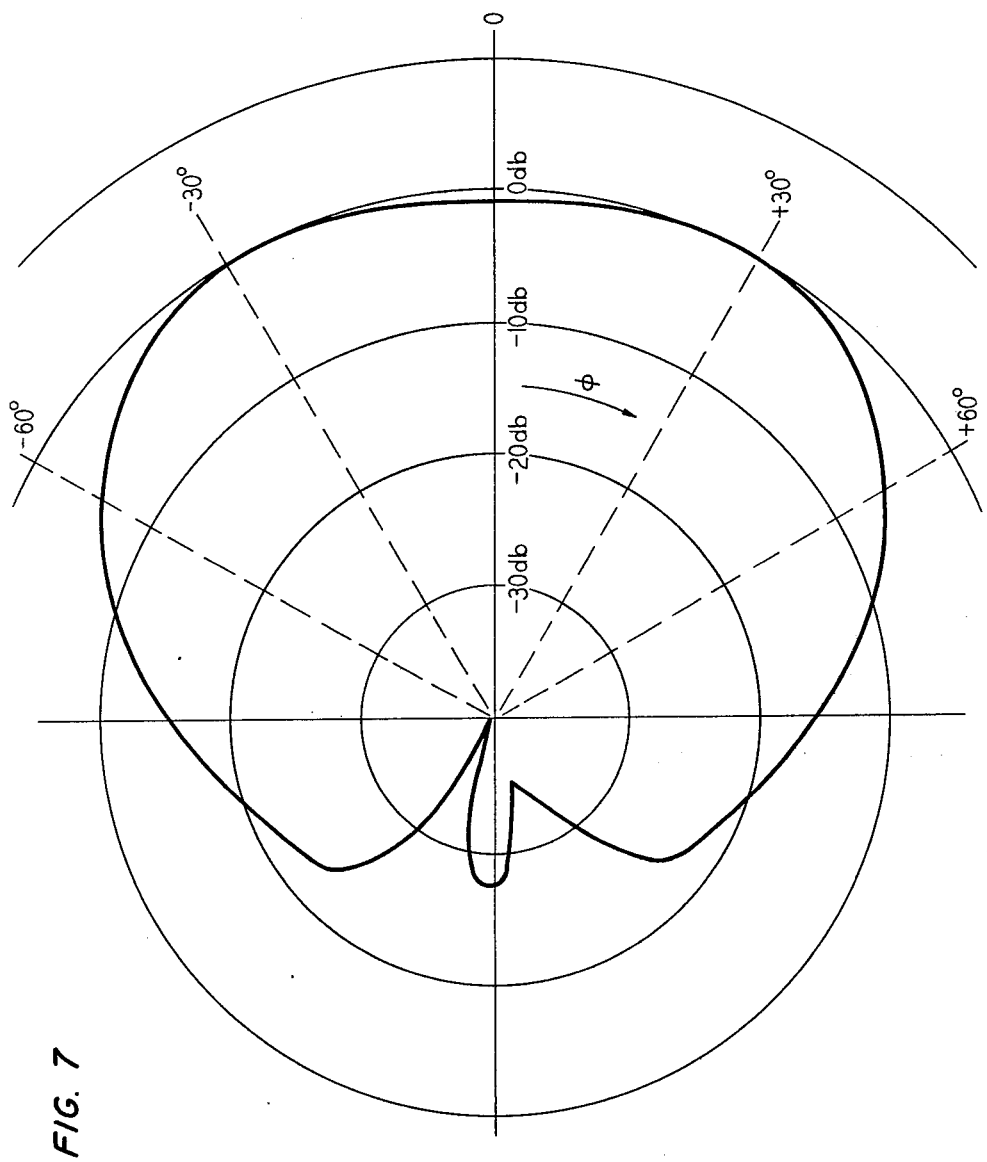
FIGS. 7 and 8 are antenna gain patterns in a horizontal plane at center beam for the directional antenna of FIG. 4.

FIG. 7 depicts an antenna gain plot on polar coordinate in the horizontal plane at the level of the antenna for the same directional antenna illustrated in FIG. 4. This plot assumes use of that directional antenna for radiation throughout a 120 degree sector including 60 degree sectors immediately adjacent to the 0 degree center-beam line. That line is usually considered to be the maximum gain line for the antenna pattern and also is the 0 degree line for the untilted pattern in FIG. 5. However, in the case of the particular antenna illustrated in FIG. 4, the pattern has a slight flat portion in the 0 degree region. Otherwise, however, the gain pattern evidences essentially maximum gain throughout a sector spanning approximately 35 degrees either clockwise or counterclockwise from the 0 degree line.

As previously noted, tilting the antenna gain pattern of the vertical plane downward causes an increased gain portion to serve most of the served area and, thus, directs proportionately more energy into the serving cell and less into the interfering cell, as well as receiving less energy from the interfering cell. In addition, however, it has been found, and it has been indicated in connection with FIG. 5, that as the pattern is tilted so that the maximum gain line is depressed below the horizontal the gain on the 0 degree line in the vertical plane of FIG. 5 is reduced. More particularly, however, it has been found that the reduction in gain along that line is proportionately larger than along other ray lines in the horizontal gain pattern of FIG. 7 within the 120 degree field of principal interest for the indicated directional antenna. Thus, increasing tilt produces an increasing notch in the gain pattern.

Figure 8:
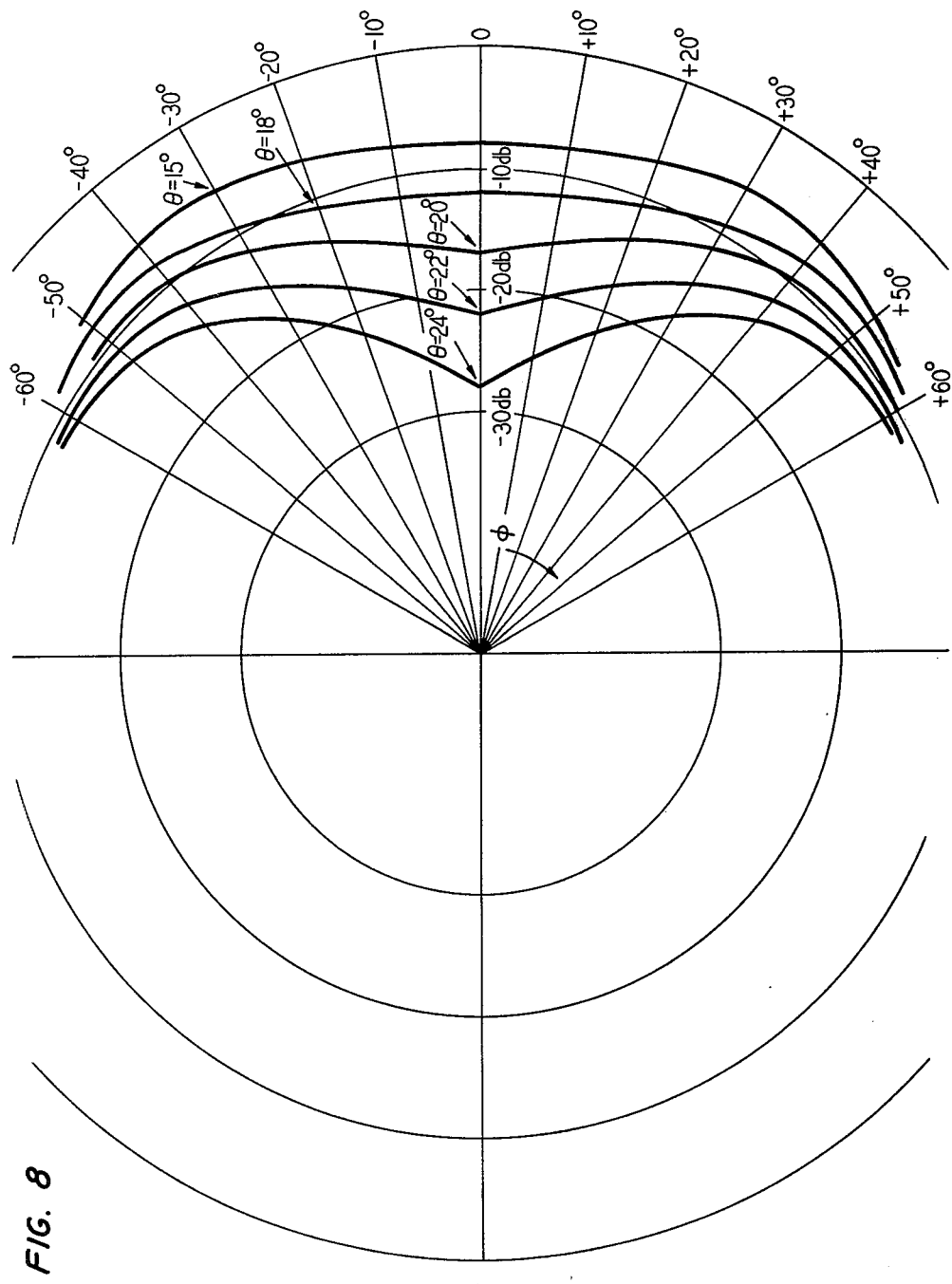

Changes in the notch in the horizontal gain pattern of the antenna are illustrated in FIG. 8. This is a further representation of the 120 degree horizontal plane sector of FIG. 7 and includes a plurality of antenna gain pattern portions in that sector for different degrees of tilt. Tilt angles $\theta$ are measured in the vertical plane of FIG. 5, and the angles $\phi$ indicated in FIG. 8 are the angles with respect to the center beam, 0 degree ray for different rays of consideration measured either clockwise or counterclockwise from center beam in the horizontal plane, i.e., measuring either clockwise or counterclockwise from the vertical plane of the diagram of FIG. 5. It is evident from FIG. 8 that as the angle $\theta$ of tilt is increased from 15 degrees through 24 degrees the depth of the notch at center beam increases slowly at first and then more rapidly. However, the extent of change is less at greater angles from the center beam position until at the plus and minus 60 degree positions there is a total change of less than 5 db through the 15-degree to 24-degree tilt range. It is believed that this increasing notch effect is due to the fact that as the angle $\phi$ of consideration increases in either direction the effective angle $\psi$ of tilt decreases.

Figure 9:
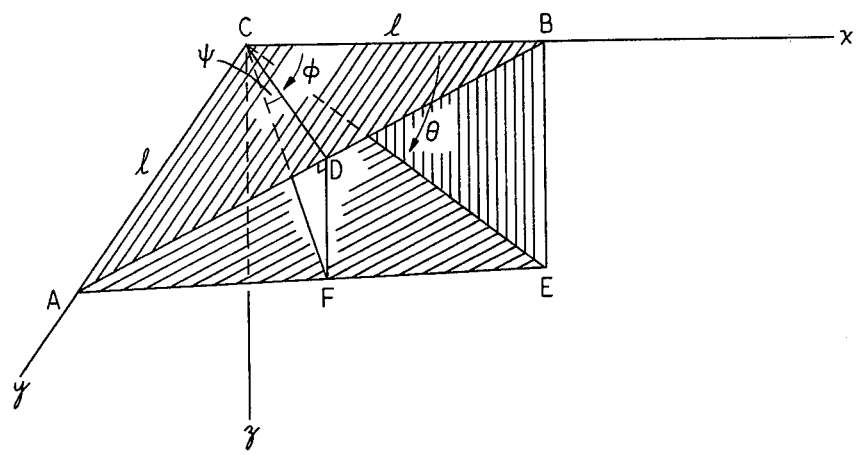
FIG. 9 is a geometric diagram illustrating one aspect of the present invention.

FIG. 9 is a diagram of geometric relationships illustrating the foregoing relationship regarding the effective angle of tilt. In FIG. 9, three coordinate axes, x, y, and z, are shown for the three principal directions, and they converge at the origin C. In the fashion shown, xy is considered the horizontal plane, xz the vertical plane, and yz a plane intersecting them both and orthogonal to them both. Now, if the antenna gain pattern of FIG. 5 is visualized in the xz plane centered at C but tilted downward at some angle $\theta$ the center-beam line of the pattern includes the line CE in the xz plane of FIG. 9. Now, assuming that the triangle ACB is in the xy plane, i.e., the horizontal plane, the triangle ACE is then in a plane including the center-beam line of the tilted gain pattern and perpendicular to the vertical plane; so that it swings about an axis coincident with the line AC as the gain pattern is tilted through the angle $\theta$. Thus, in a geometric sense, the resulting triangles in FIG. 9 form a tetrahedron ABCE.

Now, if a line CD is drawn in the triangular face ABC (in the horizontal xy plane), it can be used with the line CB in the x axis to define the angle $\phi$ (BCD) of consideration in the horizontal plane. That line CD is also considered to be part of a triangle CDF wherein the side DF is in a plane defined by triangle ABE and is always perpendicular to the line AB for every angle $\phi$. Then the angle $\psi$ (FCD) is the effective tilt angle for each angle $\phi$ of consideration. In the illustrated quadrant of space, that effective tilt angle $\psi$ may have any value from 0 degrees when $\phi$ is equal to 90 degrees (i.e., CD is coincident with CA) to a value equal to the center-beam tilt angle $\theta$ when $\phi$ is 0 degrees (i.e., CD is coincident with CB).

Figure 10:
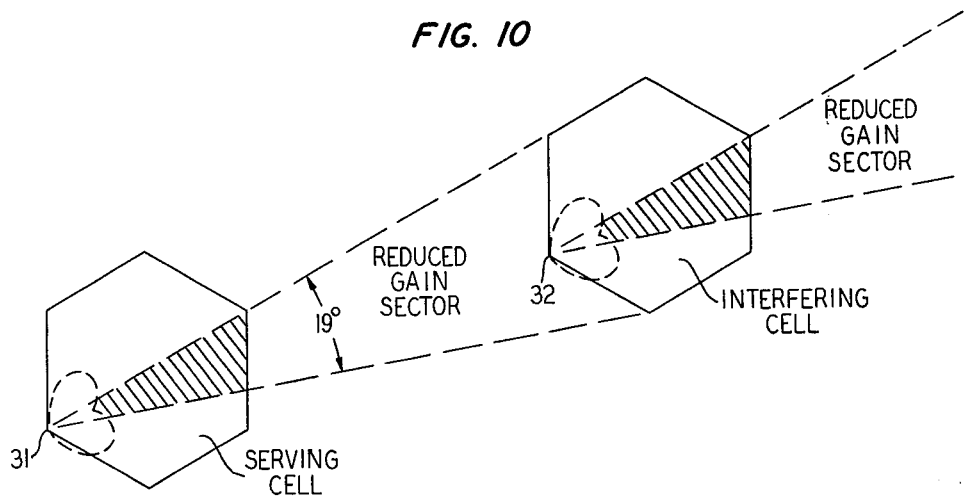
FIG. 10 is a horizontal plan view of a serving and interfering cell pair utilizing the present invention.

Referring now to FIG. 10, there is assumed a cellular radio system of the type indicated in FIG. 1 and utilizing 7 cells per pattern. When viewed from a directional antenna site of a serving cell on the left, the cell of the nearest cochannel interfering antenna site 32, and which is also closest to the ideal center-beam line of the serving site 31, is spanned by a 19-degree sector, or field of view, from that serving cell site. The ideal center beam line is midway between the nominal cell boundary lines intersecting at the site 31. That closest cochannel interfering site 32 is off the center-beam line by about 10 degrees. If the serving cell antenna is operated to have a notch so that its pattern has a reduced gain sector spanning a significant part of the cochannel cell width, it will be apparent, for example, from FIG. 3 that the result is both a reduction in serving antenna gain (that causes a reduction in field strength of serving signal) at the cochannel interfering site 32 and an increase in the serving cell. Thus, the serving cell interferes less in the interfering cell and receives, at least because of its own antenna pattern tilt, less useful energy from that interfering site. That serving cell also has higher sending and receiving strengths for its own signals in the serving cell. At the interfering cell site the propagation loss also is much greater. Consequently, referring for the moment back to FIG. 5 and the dashed line characteristic which is tilted at an angle of about 20 degrees at center beam, it is seen that for a cell served by rays of 10 degrees or more in the vertical plane, the intersections of such rays with the gain characteristic curve are with few exceptions at significantly higher gains than in the untilted case. One exception is in the region of 45 degrees to about 63 degrees where lower gain results; but in that region a mobile unit is within 200 feet of the base of the antenna mounted 200 feet above ground and hence experiences relatively high field intensity.

In reference to FIG. 8 and a 22-degree tilt, it is noted that between + and −10 degrees of azimuth the gain is down the most, i.e. 20 to 22 db, and rises relatively quickly on either side of that sector. If the antenna is oriented so that such sector spans the cell of the interfering site 32 of FIG. 10, a proportionately greater interference reduction effect is experienced at the interfering site than in most of the serving cell, and this further improves the S/I ratio. FIG. 7 shows that the mentioned 10-degree rotation of the antenna in the horizontal plane causes some gain degradation in the counterclockwise 50 to 60-degree sector on the ground, but that degradation is only about 5 db at most, and it occurs in a region which is relatively unaffected by tilt degradation as seen in FIG. 8.

Thus, the tilting improves the S/I ratio in the serving cell taken alone and also improves the ratio in the overall system when used at multiple cell antenna sites over a large area. The notch effect is not usually available in omnidirectional systems unless the antenna system is made up, for example, of three 120-degree directional antennas driven with the same signal to cover a 360-degree field. In that event, one or more of those directional antennas is advantageously tilted sufficiently to provide a notch in its individual gain pattern and a correspondingly reduced field intensity sector subtended by an interfering cell region.

Although the present invention has been described in connection with particular embodiments thereof, it is to be understood that additional embodiments, applications, and modifications thereof which will be obvious to those skilled in the art are included within the spirit and scope of the invention.

I claim:

1. In a cellular mobile radiotelephone system in which a given set of radio channels is assigned for use in a predetermined adjacent-cell pattern (FIG. 1), which pattern is iteratively employed for providing radiotelephone service to a mobile service area, each cell having predetermined nominal boundaries and being served through at least one antenna site (31) in the cell, the improvement comprising means (16) for operating an antenna (11,12) site (31) to produce in a predetermined region of a cell served thereby radiation such that a vertical-plane center-beam line of approximately maximum antenna gain is tilted to a predetermined angle ($\theta$) below the horizontal for thereby illuminating more of the served cell region with a higher gain portion of the antenna radiation pattern (FIG. 3) than would be the case for a horizontally oriented center-beam line.

2. The system in accordance with claim 1 in which the operated antenna site includes an omnidirectional antenna means (20).

3. The system in accordance with claim 1 in which the operated antenna site includes a directional antenna means (11,12).

4. The system in accordance with claim 1 in which
    a plurality of cells of said system are each provided at a cell antenna site thereof with means (16) for producing downwardly tilted antenna gain patterns.

5. The system in accordance with claim 1 in which
    said operating means (16) includes means for tilting said center-beam line by a sufficiently large tilt angle to intersect ground level plane in the cell of the operated site at a point within said nominal boundary of such cell.

6. The system in accordance with claim 5 in which
    the operated antenna site includes a directional antenna means (11,12), and the antenna means gain pattern (FIG. (8)) in a horizontal plane through said directional antenna means at the operated site is characterized by a reduced-gain notch centered on the horizontal projection of said center-beam line.

7. The system in accordance with claim 6 in which said operating means (16) is oriented so that the center of said notch is included on a straight line between the operated antenna site (31) and a corresponding antenna site (32) of a cochannel cell in a different pattern iteration.

8. The system in accordance with claim 6 in which said directional antenna means is oriented so that a reduced field strength sector (FIG. 10) of antenna radiation extending through said notch includes the full width, at said nominal-boundaries, of the nearest cochannel cell of said system and which cochannel cell is in the field of radiation of said directional antenna means.

* * * * *